United States Patent
Yamane et al.

(10) Patent No.: US 10,676,622 B2
(45) Date of Patent: Jun. 9, 2020

(54) MULTILAYER COATING FILM AND COATED ARTICLE

(71) Applicant: MAZDA MOTOR CORPORATION, Hiroshima (JP)

(72) Inventors: Takakazu Yamane, Hiroshima (JP); Keiichi Okamoto, Hiroshima (JP); Kouji Teramoto, Hiroshima (JP); Ryuji Nonaka, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 16/087,020

(22) PCT Filed: Sep. 30, 2016

(86) PCT No.: PCT/JP2016/079177
§ 371 (c)(1),
(2) Date: Sep. 20, 2018

(87) PCT Pub. No.: WO2018/061217
PCT Pub. Date: Apr. 5, 2018

(65) Prior Publication Data
US 2019/0092947 A1    Mar. 28, 2019

(51) Int. Cl.
| | | |
|---|---|---|
| B32B 27/20 | (2006.01) | |
| C09D 7/61 | (2018.01) | |
| C09D 7/41 | (2018.01) | |
| C09D 5/29 | (2006.01) | |
| C09D 5/33 | (2006.01) | |
| B05D 5/06 | (2006.01) | |
| B05D 7/00 | (2006.01) | |
| C09D 7/40 | (2018.01) | |

(52) U.S. Cl.
CPC ............ *C09D 5/004* (2013.01); *B05D 5/065* (2013.01); *B05D 7/57* (2013.01); *B32B 27/20* (2013.01); *C09D 5/29* (2013.01); *C09D 7/41* (2018.01); *C09D 7/61* (2018.01); *C09D 7/70* (2018.01); *B05D 2202/00* (2013.01); *B05D 2601/08* (2013.01); *B05D 2601/10* (2013.01)

(58) Field of Classification Search
None
See application file for complete search history.

(56) References Cited

U.S. PATENT DOCUMENTS

| | | | |
|---|---|---|---|
| 2005/0208292 A1 | 9/2005 | Kuramochi et al. | |
| 2007/0129485 A1 | 6/2007 | Iida et al. | |
| 2016/0288164 A1* | 10/2016 | Sato | B05D 5/068 |

FOREIGN PATENT DOCUMENTS

| | | |
|---|---|---|
| JP | H05-076833 A | 3/1993 |
| JP | 2000-271536 A | 10/2000 |
| JP | 2000-319521 A | 11/2000 |
| JP | 2001-164191 A | 6/2001 |
| JP | 2001-232283 A | 8/2001 |
| JP | 2005-169385 A | 6/2005 |
| JP | 2005-177541 A | 7/2005 |
| JP | 2006-281451 A | 10/2006 |
| JP | 2007-167720 A | 7/2007 |
| JP | 2007-182527 A | 7/2007 |
| JP | 2011-162732 A | 8/2011 |
| JP | 2012-017364 A | 1/2012 |
| JP | 2012-232236 A | 11/2012 |
| JP | 2013-169507 A | 9/2013 |
| JP | 2016-193385 A | 11/2016 |

OTHER PUBLICATIONS

International Search Report issued in PCT/JP2016/079177; dated Dec. 20, 2016.

* cited by examiner

*Primary Examiner* — Sheeba Ahmed
(74) *Attorney, Agent, or Firm* — Studebaker & Brackett PC

(57) ABSTRACT

FF properties of a multilayer coating film configured to exhibit a warm color through a lustrous layer (14) and a translucent colored layer (15) are improved to achieve a metallic textured color having a high-quality color tone. The lustrous layer (14) contains, in a mixed state, a high-reflection flake (21) having a visible light reflectance of 90 % or more and a low-reflection flake (22) having a visible light reflectance that is half (i.e., ½) or smaller than the visible light reflectance of the high-reflection flake (21) as the luster material. When both of the high-reflection flake (21) and the low-reflection flake (22) are projected on a bottom of the lustrous layer (14), a ratio of a projected area of the flakes (21) and (22) on the bottom of the lustrous layer (14) is 100 %.

6 Claims, 16 Drawing Sheets

MULTILAYER COATING FILM AND COATED ARTICLE

TECHNICAL FIELD

The present invention relates to a multilayer coating film comprised of a lustrous layer (a metallic base layer) containing a luster material, and a colored layer (a color-clear layer), formed on the lustrous layer, which is transparent and containing a pigment. The present invention also relates to a coated object including the multilayer coating film.

BACKGROUND ART

In recent years, paint colors exhibiting high chroma at highlights and also giving an impression of great depth are desired for a coating target (such as an automobile) which is required to have high-quality color tone. Patent Document 1 discloses achieving a color tone giving a sense of depth by using a multilayer sheet suitable for use in forming automobile-related components. The multilayer sheet of Patent Document 1 is comprised of a metal gloss layer and a colored layer layered on the metal gloss layer. The lightness L* of light that is allowed to pass through the colored layer is set to be 20 to 80, the gloss value of the metal gloss layer to be 200 or more, and the chroma C* of the specular reflected light, reflected at a 45-degree angle, to be 150 or more. Patent Document 1 also discloses adding aluminum flakes in the metal gloss layer, and using perylene red as a pigment for the colored layer.

CITATION LIST

Patent Document

Patent Document 1: Japanese Unexamined Patent Publication No. 2006-281451

SUMMARY OF THE INVENTION

Technical Problem

It is the flip-flop properties (hereinafter referred to as the "FF properties") that give an effect of light and shade or metallic impression to a metallic coat provided, for example, on an automobile body. With the FF properties, the lightness of the coated object varies depending on an angle from which it is viewed. That is, with the FF properties, the lightness (i.e., highlights) and the darkness (i.e., shades) become more distinct. The FF properties are often expressed by a flop index (FI) (a metallic impression index) value of X-Rite, Inc. However, the FI value obtained so far in metallic coatings is about 18, in general, and stunning, enhanced metallic impression has not been achieved yet.

Briefly saying, the FI value expresses the degree of lightness of highlights (when viewed from near the specular reflection angle) with reference to the lightness of the shades, and therefore, the FI value is small if the lightness at highlights is low. The amount of luster material may be increased to increase the lightness of the highlights. However, an increase in the amount of luster material increases diffuse reflection of the luster material and the lightness of shaded portions, as well. That means that significant FF properties cannot be achieved.

It is therefore an object of the present invention to achieve a metallic textured color having a high-quality color tone for a multilayer coating film configured to exhibit a warm color through a lustrous layer and a translucent colored layer.

Solution to the Problem

To achieve the above object, the present invention uses high-reflection flakes and low-reflection flakes in combination as a luster material of a lustrous layer.

A multilayer coating film disclosed herein includes: a lustrous layer containing a luster material and formed directly or indirectly on a surface of a coating target; and a colored layer which is translucent, containing a warm color pigment, and layered on the lustrous layer. The lustrous layer contains, in a mixed state, a high-reflection flake having a visible light reflectance of 90% or more and a low-reflection flake having a visible light reflectance that is half (i.e., ½) the visible light reflectance of the high-reflection flake as the luster material. When both of the high-reflection flake and the low-reflection flake are projected on a bottom of the lustrous layer, a ratio of a projected area of the flakes on the bottom of the lustrous layer is 100%.

The high-reflection flakes, such as aluminum flakes, effectively increase the lightness of the highlight. However, diffuse reflection occurs due to minute projections and depressions on the surface of the flake and/or due to the edges of the flake. The diffuse reflection occurs on a first coat of the lustrous layer, as well. Thus, simply adjusting the concentration of the high-reflection flakes is not enough to adjust the lightness of the shade to an intended darkness. To deal with this, the present invention uses the high-reflection flakes and the low-reflection flakes in combination so that the reflection properties of the shade can be adjusted by taking advantage of the light absorption and shielding properties of the low-reflection flakes.

More specifically, a ratio of the projected area of those flakes on the bottom of the lustrous layer is 100%. Thus, much of incident light passing through the space between the high-reflection flakes comes into contact with, and is blocked by, the low-reflection flakes. Light reflection by the first coat therefore hardly occurs. The lightness of the shade decreases because the light diffusely reflected by the high-reflection flakes is blocked or absorbed by the low-reflection flakes. The reflection properties exhibiting a high FI value can thus be obtained by only the lustrous layer without a black colored base layer provided under the lustrous layer. This is advantageous in achieving a metallic textured color having high-quality color tone.

In one embodiment of the present invention, the low-reflection flake is smaller in thickness than the high-reflection flake.

The greater the thickness of the flake luster material is, the stronger the diffuse reflection caused by the edges of the flake becomes. Thus, the diffuse reflection caused by the low-reflection flake is weak because the low-reflection flake is smaller in thickness than the high-reflection flake. The low-reflection flakes are therefore advantageous in reducing the lightness of the shade. Since the low-reflection flakes contribute to the shielding of the base coat, it is not necessary to add a great amount of high-reflection flakes which diffusely reflect light at edges.

In one embodiment of the present invention, the visible light reflectance of the low-reflection flake is one fourth (i.e., ¼) or less of the visible light reflectance of the high-reflection flake, and a ratio of a total area of the high-reflection flake with respect to a total area of both of the high-reflection flake and the low-reflection flake is 25% or more and 75% or less. This configuration allows the low-reflection flake to exhibit effective light shielding or absorption properties, and is advantageous in improving an FI value.

In one embodiment of the present invention, the high-reflection flake is an aluminum flake, and the low-reflection flake is a chrome oxide flake.

In one embodiment of the present invention, a mean value of reflectances of the lustrous layer which are measured at a light receiving angle of 110° in the case of a light incident angle of 45° within a wavelength range of between 450 nm and 700 nm is set to be 0.003 or more and 0.045 or less, defined as an absolute value, with respect to a reflectance of a standard white plate. This configuration contributes to obtaining a higher FI value, and is advantageous in achieving a strong effect of light and shade.

In one embodiment of the present invention, the pigment of the colored layer is a reddish pigment. Thus, a metallic textured red color can be achieved.

Suitable examples of the reddish pigment include organic pigments, such as perylene red, dibromo anza slon red, azo red, anthraquinone red, quinacridone red, diketopyrrolopyrrole.

In one embodiment of the present invention, a transparent clear layer is layered directly on the lustrous layer. The resistance to acids and scratches can be achieved by the transparent clear layer.

The coated object including the multilayer coating film provided on a coating target is, for example, an automobile body. The coated object may also be a body of a motorcycle or bodies of other vehicles, or may be other metal products or plastic products.

Advantages of the Invention

According to the present invention, in a multilayer coating film configured to exhibit a warm color through a lustrous layer and a translucent colored layer, a lustrous layer contains, in a mixed state, a high-reflection flake having a visible light reflectance of 90% or more and a low-reflection flake having a visible light reflectance that is half (i.e., ½) or smaller than the visible light reflectance of the high-reflection flake. When both of the high-reflection flake and the low-reflection flake are projected on a bottom of the lustrous layer, a ratio of a projected area of the flakes on the bottom of the lustrous layer is 100%. This configuration allows the low-reflection flake to exhibit effective light shielding or absorption properties, and is advantageous in achieving a metallic textured color having high-quality color tone.

DESCRIPTION OF EMBODIMENT

An embodiment of the present invention will now be described with reference to the drawings. The following description of preferred embodiment is only an example in nature, and is not intended to limit the scope, applications or use of the present invention.

<Example Configuration of Multilayer Coating Film>

Figure 1:
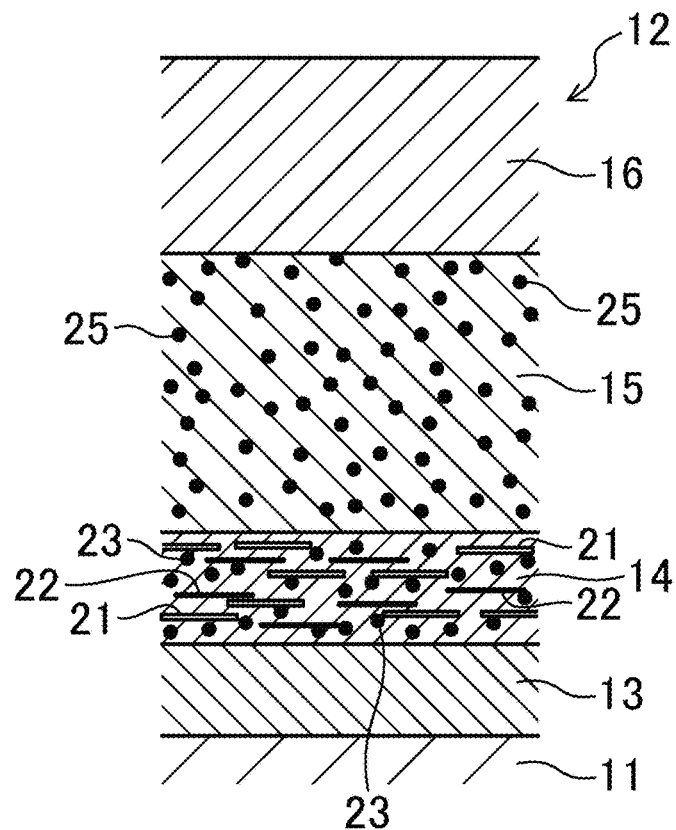
FIG. 1 is a diagram schematically illustrating a cross-sectional view of a multilayer coating film.

As illustrated in FIG. 1, a multilayer coating film 12 provided on a surface of an automobile body 11 according to the present embodiment contains a lustrous layer (first base) 14, a colored layer (second base) 15 that is translucent, and a transparent clear layer 16, which are sequentially stacked one upon the other. An electrodeposition coating film 13 is formed on the surface of the automobile body 11 by cationic electrodeposition. The multilayer coating film 12 is provided on the electrodeposition coating film 13.

The lustrous layer 14 contains, as flake luster materials, high-reflection flakes 21 and low-reflection flakes 22 smaller in thickness than the high-reflection flakes 21. The lustrous layer 14 also contains warm color pigments 23 as pigments, a UV-shielding material, and so on. The colored layer 15 contains warm color pigments 25 in a color similar to the warm color pigments 23 in the lustrous layer 14, a UV-shielding material, and so on.

The flake luster materials 21 and 22 are oriented approximately parallel to a surface of the lustrous layer 14 (such that the orientation angles of the luster materials 21 and 22 with respect to the surface of the lustrous layer 14 be 3 degrees or less). After having applied a coating, which contains the luster materials 21 and 22 and the pigments 23, onto the electrodeposition coating film 13, a solvent included in the coating film is vaporized by stoving. As a result, the coating film shrinks in volume and becomes thin, and the luster materials 21 and 22 are arranged at the orientation angle of 3 degrees or less (preferably 2 degrees or less).

Pigments of various hues including, for example, a reddish pigment, e.g., perylene red, may be employed as the pigments 23 and 25. Perylene red having a mean particle size of 2 nm or more and 160 nm or less is particularly suitable as the pigments 25.

A UV absorber of an organic compound, a UV-scattering agent of an inorganic compound, etc., may be employed as the UV-shielding materials. Nanoparticles of a metal oxide, e.g., iron oxide, are particularly suitable as the UV-shielding materials.

For example, acrylic-based resin may be employed as the resin component of the lustrous layer 14 and the colored layer 15. For example, carboxylic acid group containing acrylic resin, a combination of polyester resin and epoxy containing acrylic resin, a combination of polyisocyanate with acrylic resin and/or polyester resin may be employed as the resin component of the transparent clear layer 16.

The pigment concentration of the lustrous layer 14 is preferably 3% by mass or more and 20% by mass or less. The pigment concentration of the colored layer 15 is preferably 1% by mass or more and 17% by mass or less.

The thickness of the lustrous layer 14 is preferably 5 μm or more and 8 μm or less. The thickness of the colored layer 15 is preferably 8 μm or more and 15 μm or less.

<Reflection Properties of Lustrous Layer 14>

Figure 2:
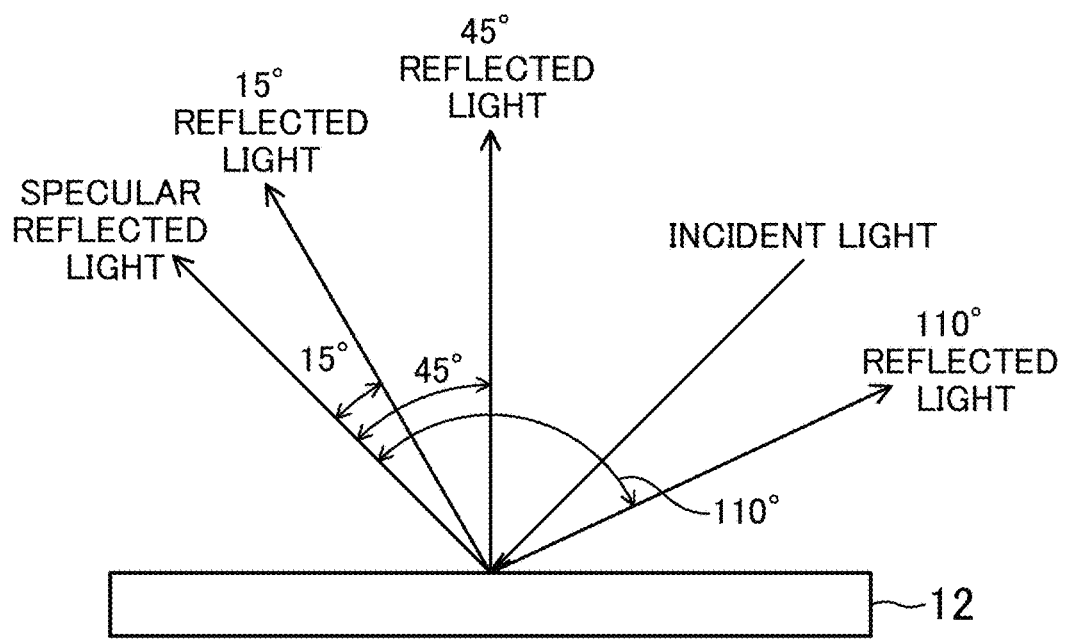
FIG. 2 is a diagram illustrating reflected light for explaining how to calculate an FI value.

To achieve the metallic textured color, lightness needs to be high at the highlights and low at the shades. That is, the multilayer coating film 12 needs to have a high FI value. As illustrated in FIG. 2, the FI value is obtained from the equation shown below, wherein: $L^*45°$ is a lightness index of reflected light (45° reflected light) at a light receiving angle (a tilt angle toward a light source from a specular reflection angle) of 45 degrees; $L^*15°$ is a lightness index of reflected light (150 reflected light) at the light receiving angle of 15 degrees; and $L^*110°$ is a lightness index of reflected light (110° reflected light) at the light receiving angle of 110 degrees, in a case where light is incident on a surface of the multilayer coating film 12 at an incident angle of 45 degrees (an angle tilted 45 degrees from a normal to the surface of the multilayer coating film 12).

$$FI=2.69\times(L^*15°-L^*110°)^{1.11}/L^*45°^{0.86}$$

Figure 3:
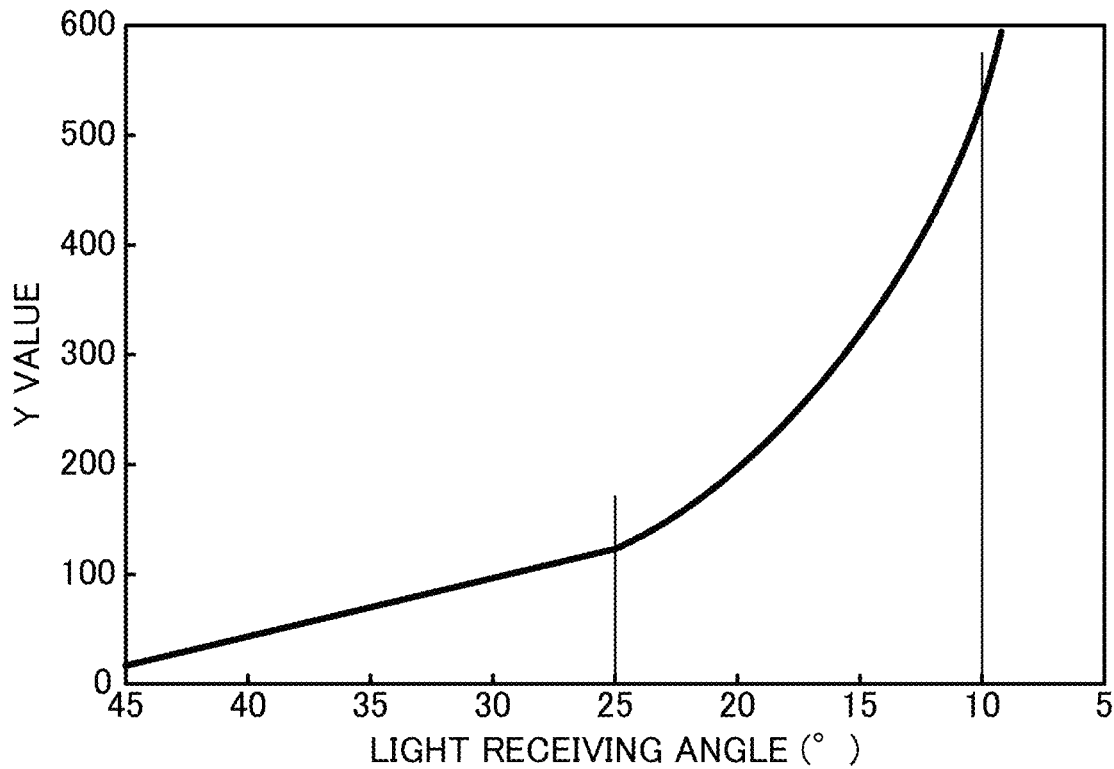
FIG. 3 is a graph showing an example angle dependence of Y(10°) with respect to a lustrous layer in a state without a pigment.
Figure 4:
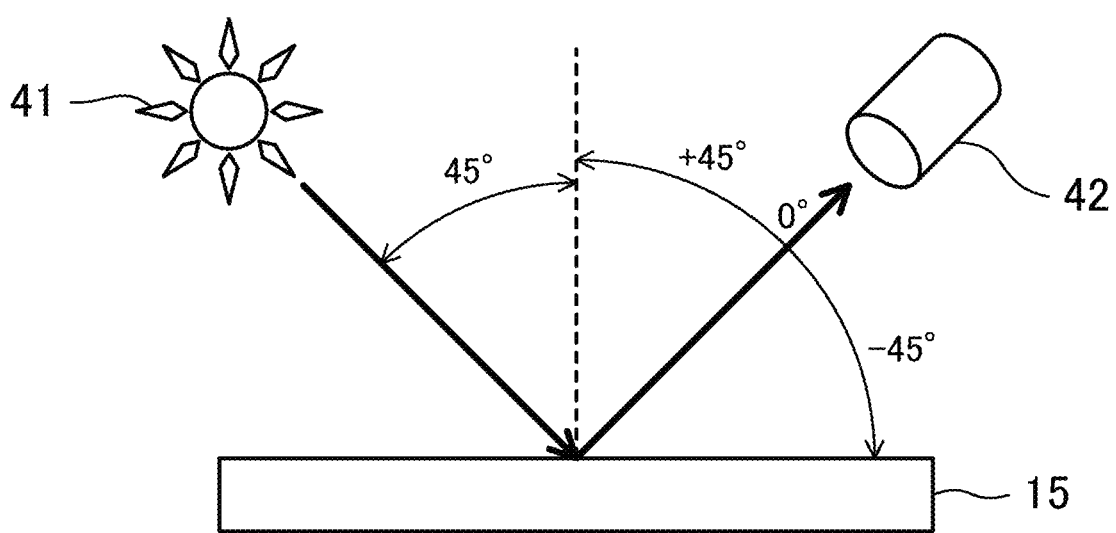
FIG. 4 illustrates how a value Y is measured.

FIG. 3 illustrates example angle dependence of a Y value according to the XYZ color system, which is calibrated by a standard white plate, of the lustrous layer not containing a pigment. FIG. 4 illustrates how to measure the Y values. Light from a light source 41 is incident on the lustrous layer 15 at the incident angle of 45°. The light receiving angle of a sensor 42 is defined such that the specular reflection angle is 0°. A three-dimensional gonio-spectrophotometric color measurement system GCMS-4 from Murakami Color Research Laboratory was used to measure the values. In the example illustrated in FIG. 4, $Y(10°)$ is equal to 510 and $Y(25°)$ is equal to 120, wherein $Y(10°)$ represents a Y value of reflected light measured at the light receiving angle of 10°, and $Y(25°)$ represents a Y value of the reflected light measured at the light receiving angle of 25°.

In the present embodiment, the lustrous layer 14 has predetermined reflection properties to increase the FI value. That is, $Y(10°)$ of the lustrous layer 14 is 50 or more and 950 or less, and the following equation holds: $Y(25°)=k\times Y(10°)$ (where k is a coefficient and equal to 0.05 or more and 0.35 or less). The coefficient k is a reduction rate of the reflection intensity that is reduced when the light receiving angle changes from 10° to 25°. The above equation utilizes, as indexes, $Y(10°)$ representing the reflection intensity at the light receiving angle of 10° and the reduction rate k of the reflection intensity that is reduced when the light receiving angle changes to 250, in order to obtain the reflection properties according to which it is bright at the highlight and the darkness increases near the shade.

A mean value of reflectances of the lustrous layer 14 which are measured at the light receiving angle of 110° (a typical shading angle) in the case of the incident angle of 45° within a wavelength range of between 450 nm and 700 nm (hereinafter referred to as a "mean reflectance at the light receiving angle of 110°") is set to be 0.003 or more and 0.045 or less if defined as an absolute value (0.3% or more and 4.5% or less if defined as a percentage value) with respect to the reflectance of a standard white plate.

[Combination of High-Reflection Flake and Low-Reflection Flake]

To achieve the above reflection properties of the lustrous layer 14, the present embodiment employs the two types of flakes having different reflection properties, that is, the high-reflection flakes 21 and the low-reflection flakes 22, as mentioned above.

The high-reflection flakes 21, such as aluminum flakes, effectively increase the lightness of the highlight. However, diffuse reflection occurs due to minute projections and depressions on the surface of the flake and/or due to the edges of the flake. The diffuse reflection occurs on the electrodeposition coating film 13, as well. Thus, simply adjusting the concentration of the high-reflection flakes 21 is not enough to adjust the lightness of the shade to an intended darkness. To deal with this, the present embodiment employs both of the high-reflection flakes 21 and the low-reflection flake 22, and adjusts the reflection properties of the shade by taking advantage of the light absorption property and shielding property of the low-reflection flakes 22.

Figure 5:
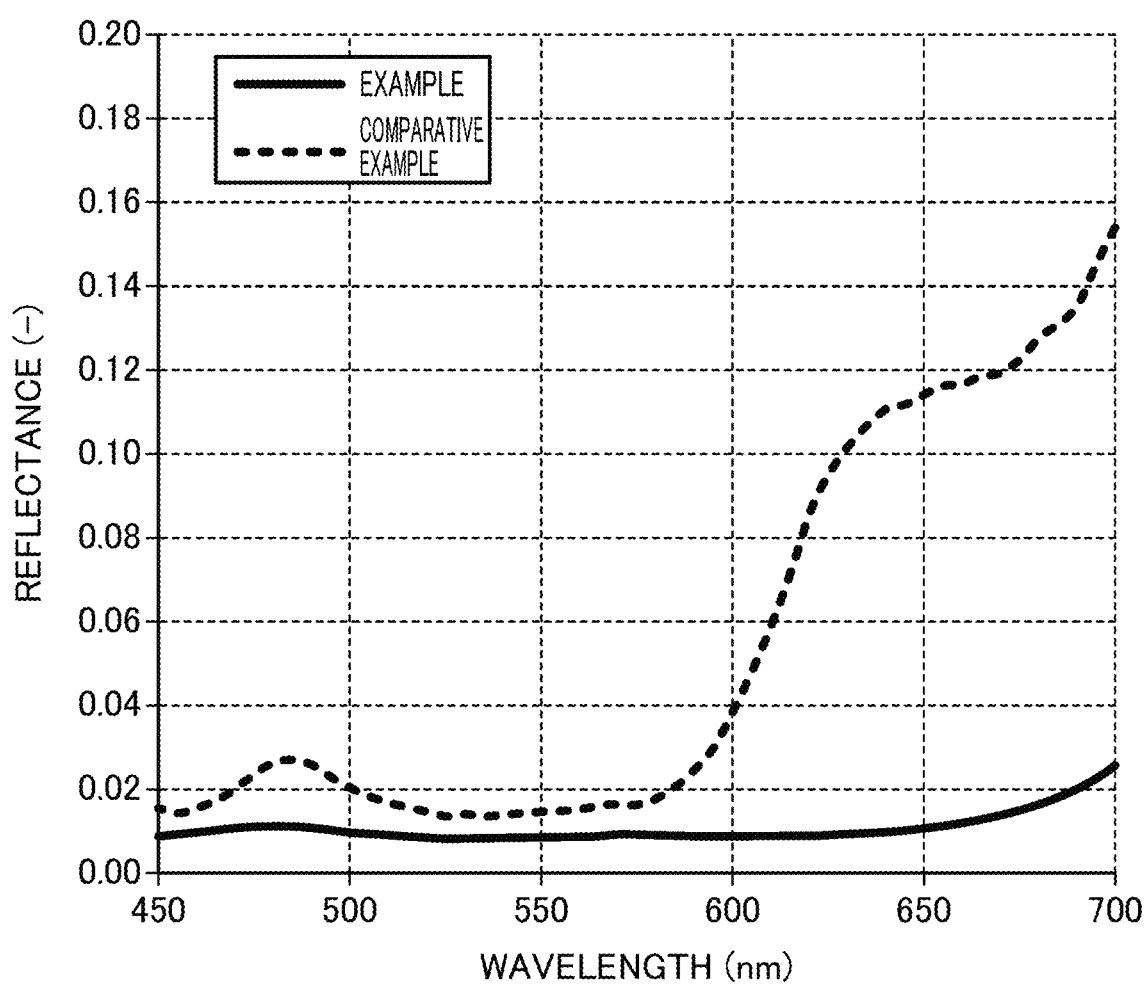
FIG. 5 is a graph showing spectral reflectances of respective lustrous layers according to an example and a comparative example, measured at a light receiving angle of 110° in the case of an incidence angle of 45°.
Figure 9:
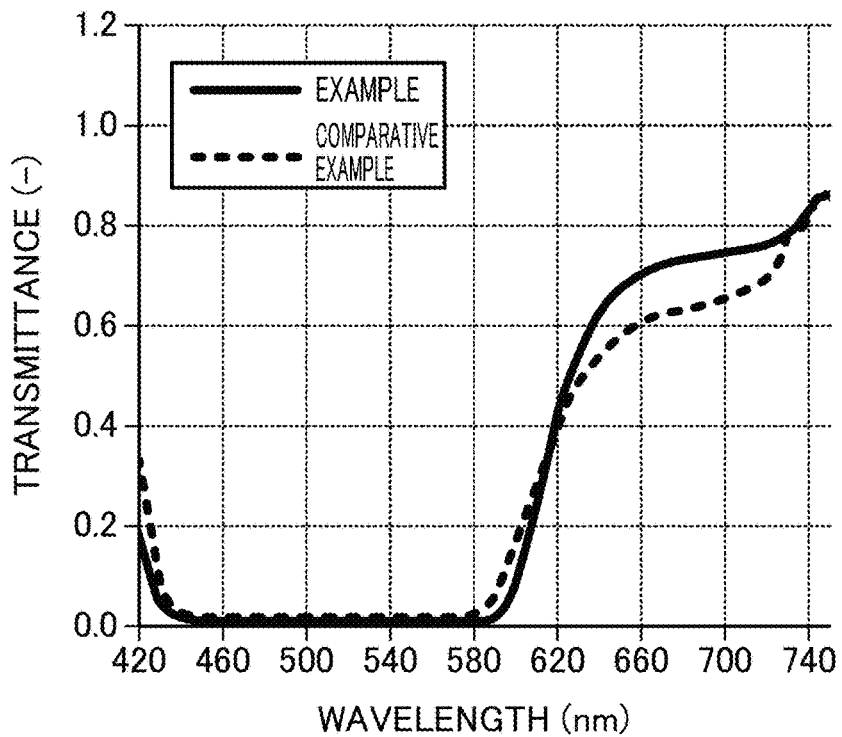
FIG. 9 is a spectrum diagram of the spectral transmittance of respective colored layers according to the example and the comparative example.
Figure 10:
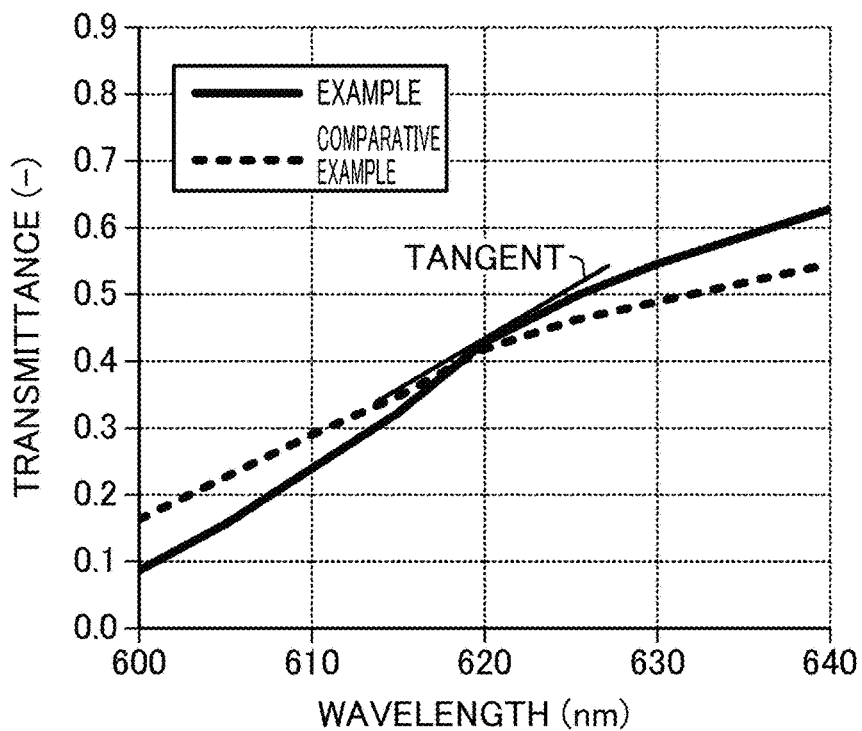
FIG. 10 is a part of the graph shown in FIG. 9 which is enlarged.

FIG. 5 shows the spectral reflectances of respective lustrous layers according to an example and a comparative example, with respect to the spectral reflectance of the standard white plate. The spectral reflectances were measured at the light receiving angle of 110° in the case of the incident angle of 45°. Note that in FIG. 5 the reflectance is defined as an absolute value, where 1=100%. Similarly, the reflectance in Tables 1 to 3 and FIGS. 7 and 8 and the transmittance in FIGS. 9 and 10 are also defined as an absolute value. A three-dimensional gonio-spectrophotometric color measurement system GCMS-4 from Murakami Color Research Laboratory was used to measure the spectral reflectance. The specifications and the mean reflectances of the lustrous layers according to the example and the comparative example are shown in Table 1. In Table 1, aluminum flakes correspond to the high-reflection flakes 21, and chrome oxide flakes correspond to the low-reflection flakes 22.

TABLE 1

| | | | Example | Comparative Example |
|---|---|---|---|---|
| Lustrous Layer | Pigment | Perylene Red (Mean Particle Size of 200 nm) | 13 mass % | 11 mass % |
| | Luster Material | Aluminum Flake | 13 mass % | 10.5 mass % |
| | | Chrome Oxide Flake | 1.5 mass % | 0 mass % |
| | Resin | Acrylic Resin | 44 mass % | 40 mass % |
| | | Melamine Resin | 18 mass % | 27 mass % |
| | Additive | Surface Modifier, etc. | 10.5 mass % | 11.5 mass % |
| | Mean Reflectance at 110° Light Receiving Angle | | 0.011 | 0.047 |
| Colored Layer | Pigment | Perylene Red (Mean Particle Size of 30 nm) | 5 mass % | 0 mass % |
| | | Perylene Red (Mean Particle Size of 200 nm) | 0 mass % | 1.5 mass % |
| | Luster Material | Aluminum Flake | 0 mass % | 1.5 mass % |
| | Resin | Acrylic Resin | 58 mass % | 53 mass % |
| | | Melamine Resin | 31 mass % | 36 mass % |
| | Additive | Surface Modifier, etc. | 6 mass % | 8 mass % |
| | Tangent Inclination at 620 nm Wavelength | | 0.017 nm$^{-1}$ | 0.011 nm$^{-1}$ |
| | Chroma C* | | 87.25 | 54.58 |

FIG. 5 shows that in the comparative example, the spectral reflectance arises from around the wavelength of 580 nm, and red color development is observed even in the shade at the light receiving angle of 110°. On the other hand, in the example, the spectral reflectance arises only slightly from around the wavelength of 660 nm, and substantial color development in the shade is not observed.

Figure 6:
FIG. 6 is a picture of the lustrous layer according to the example taken from a surface of the lustrous layer.

In the lustrous layer 14, the plurality of high-reflection flakes 21 are arranged so as to overlap one another in the thickness direction of the lustrous layer 14 with a space interposed therebetween, and so are the plurality of low-reflection flakes 22. FIG. 6 is a picture of the lustrous layer of the example taken from a surface of the lustrous layer. Whitish particles in the picture are aluminum flakes. The other particles in the picture are chrome oxide flakes. As the picture clearly shows, when the two types of flakes are projected on a bottom of the lustrous layer, a ratio of the projected area of those flakes on the bottom of the lustrous layer (hereinafter this ratio will be referred to as the "projected area occupancy") is 100%.

Thus, in the situation where the high- and low-reflection flakes 21 and 22 are used in combination, much of incident light passing through the space between the high-reflection flakes 21 comes into contact with, and is blocked by, the low-reflection flakes 22. Thus, light reflection by the first coat (the electrodeposition coating film 13) hardly occurs. The lightness of the shade decreases because the light diffusely reflected by the high-reflection flakes 21 is blocked or absorbed by the low-reflection flakes 22.

For adjustment of the light reflection properties, aluminum flakes alone may be used as the luster material of the lustrous layer 14, and a black or dark colored base layer (absorption layer) which absorbs light may be provided between the lustrous layer 14 and the electrodeposition coating film 12. This is a technique in which the aluminum flake concentration of the lustrous layer 14 is adjusted and the light that has passed through the space between the aluminum flakes is absorbed by the dark colored base layer. Although coating of the dark colored base layer is necessary, the reflection properties can be adjusted by this technique.

On the other hand, the present embodiment is characterized by using, as the luster materials of the lustrous layer 14, two types of flakes 21 and 22 having different reflection properties in combination, instead of providing such an absorption layer.

[Preferable High-Reflection Flake and Low-Reflection Flake]

Preferable high-reflection flakes 21 are aluminum flakes of which a visible light reflectance is 90% or more. To achieve such high reflection properties, the aluminum flakes preferably have a mean particle size of 5 μm or more and 15 μm or less, a thickness of 20 nm or more and 200 nm or less, and a surface roughness Ra of 100 nm or less. The intended lightness of the highlight is obtained by setting the concentration of such high-reflection flakes 21 to be 8% by mass or more and 20% by mass or less with respect to the resin contained in the lustrous layer 14.

Preferably, the low-reflection flakes 22 have a visible reflectance that is a half (i.e., ½) or smaller than the visible light reflectance of the high-reflection flakes 21 so that a mean reflectance at the light receiving angle of 110° be 0.003 or more and 0.045 or less. The low-reflection flakes 22 may suitably have a mean particle size of 5 μm or more and 20 μm or less, and a thickness of 10 nm or more and 100 nm or less and a surface roughness Ra of 100 nm or less in order to reduce diffuse reflection. The thicker the flake luster material is, the stronger the diffuse reflection caused by the edges of the flake becomes. Thus, the diffuse reflection caused by the low-reflection flake 22, which is thin, is weak. The low-reflection flakes are therefore advantageous in reducing the lightness of the shade.

Figure 7:
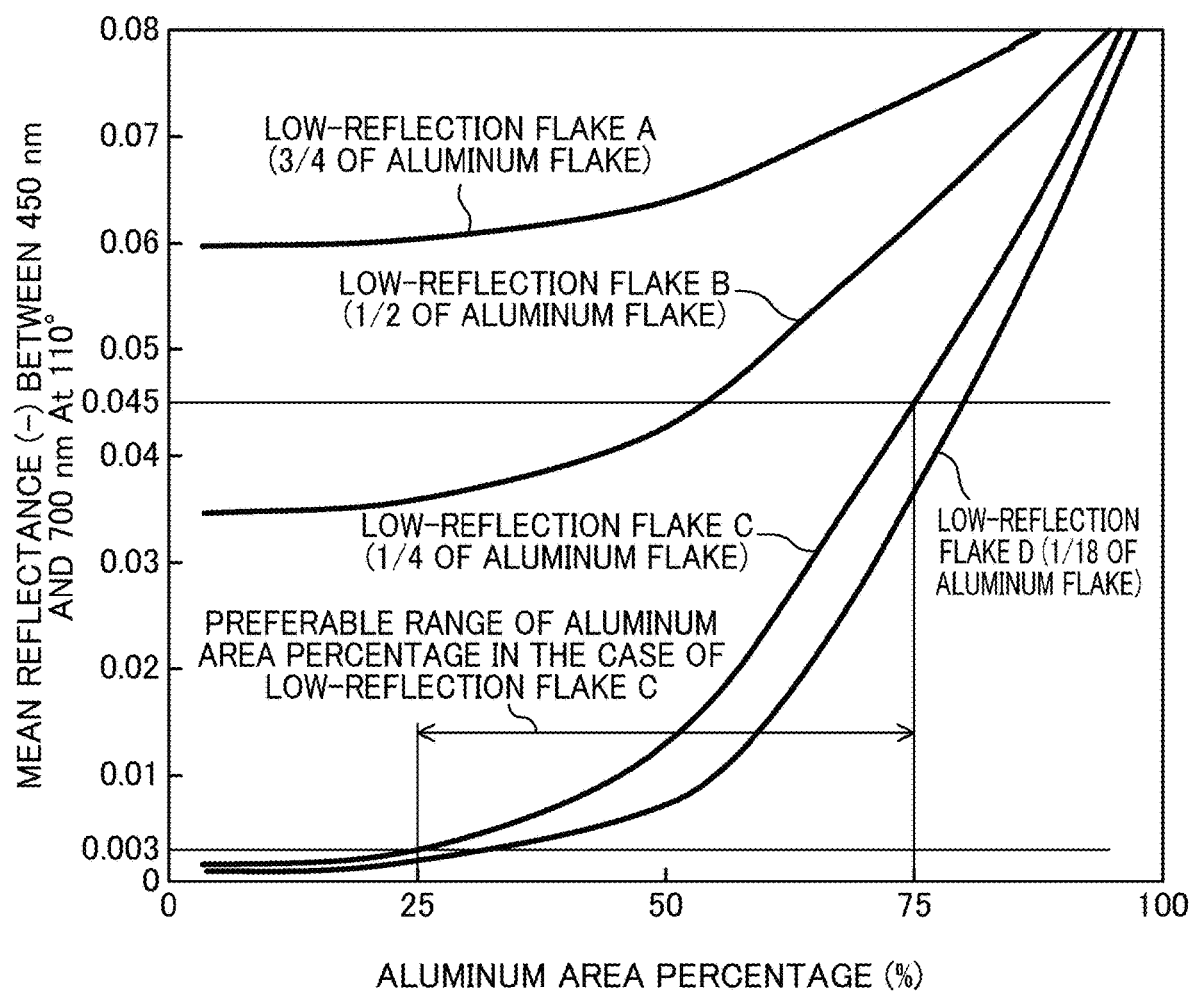
FIG. 7 is a graph showing a relationship between an aluminum area percentage in a combined use of aluminum flakes and low-reflection flakes, and a mean reflectance of the lustrous layer at the light receiving angle of 110°.

FIG. 7 depicts cases in which low-reflection flakes A to D having different reflection properties are used in combination with aluminum flakes, used as the high-reflection flakes, of which the visible reflectance is 90% or more. FIG. 7 shows a relationship between the mean reflectance of the lustrous layer 14 at the light receiving angle of 110° and a ratio of the total area of the aluminum flakes (hereinafter referred to as an "aluminum area percentage") with respect to the sum of the total area of the aluminum flakes and the total area of each of the low-reflection flakes A to D. The total areas of the respective flakes were obtained in the following manner: the lustrous layer was observed from its surface side by being magnified by a microscope; the aluminum flakes and the low-reflection flakes were differentiated from each other based on the lightness; and the total areas of the respective flakes were obtained by image processing.

The low-reflection flakes A are such flakes, typically chrome flakes, of which the visible light reflectance is three fourths (i.e., ¾) of the visible light reflectance of the aluminum flakes. The low-reflection flakes B are such flakes, typically stainless steel flakes, of which the visible light reflectance is a half (i.e., ½) of the visible light reflectance of the aluminum flakes. The low-reflection flakes C are such flakes, typically chrome oxide flakes, of which the visible light reflectance is one fourth (i.e., ¼) of the visible light reflectance of the aluminum flakes. The low-reflection flakes D are such flakes, typically plate-like iron oxide (α-$Fe_2O_3$) flakes or carbon flakes, of which the visible light reflectance is one eighteenth (i.e., 1/18) of the visible light reflectance of the aluminum flakes.

In each case, the projected area occupancy of the aluminum flakes and the low-reflection flakes projected on the bottom of the lustrous layer is 100%. Further, the aluminum area percentage is changed by changing proportions of the aluminum flakes and the low-reflection flakes while keeping the same total amount (volume %) of the aluminum flakes and the low-reflection flakes.

FIG. 7 shows that the visible reflectance of the low-reflection flakes needs to be a half (i.e., ½) or smaller than the visible light reflectance of the aluminum flakes so that the mean reflectance at the light receiving angle of 110° be 0.045 or less. FIG. 7 also shows that in a case of using the low-reflection flakes (e.g., chrome oxide flakes) of which the visible reflectance is one fourth (i.e., ¼) or less of the visible reflectance of the aluminum flakes, the mean reflectance of 0.003 or more and 0.045 or less at the light receiving angle of 110° is obtained by setting the aluminum area percentage to be 25% or more and 75% or less.

[Relationship Between FI Value and Mean Reflectance of Lustrous Layer at Light Receiving Angle of 110°]

The aluminum flakes and the chrome oxide flakes were used as the high-reflection flakes and the low-reflection flakes, respectively, and the aluminum area percentage was adjusted to produce a plurality of lustrous layers having different mean reflectances at the light receiving angle of 110°. A colored layer was provided on each of the plurality of lustrous layers, thereby obtaining a plurality of coated plates a to e. The FI value of each coated plate was measured.

In each of the coated plates, acrylic melamine resin was used as the resin of the lustrous layer, and perylene red (having a mean particle size of 200 nm) was employed as the pigment. The pigment concentration was set to be 10% by mass. The colored layers of the respective coated plates had the same configuration, that is, 5% by mass of perylene red (a mean particle size of 30 nm), 58% by mass of acrylic resin, 31% by mass of melamine resin, and the remaining percentage of an additive. The amount of aluminum flakes, the amount of chrome oxide flakes, the aluminum area percentage, and the mean reflectance at the light receiving angle of 110° of each coated plate are shown in Table 2.

TABLE 2

| Coated Plate | Aluminum Flake | Chrome Oxide Flake | Aluminum Area Percentage | Mean Reflectance |
| --- | --- | --- | --- | --- |
| a | 9 mass % | 2.7 mass % | 25% | 0.003 |
| b | 10 mass % | 2.0 mass % | 35% | 0.006 |
| c | 13 mass % | 1.5 mass % | 49% | 0.012 |
| d | 13 mass % | 0.8 mass % | 69% | 0.037 |
| e | 14 mass % | 0.2 mass % | 76% | 0.047 |

Figure 8:
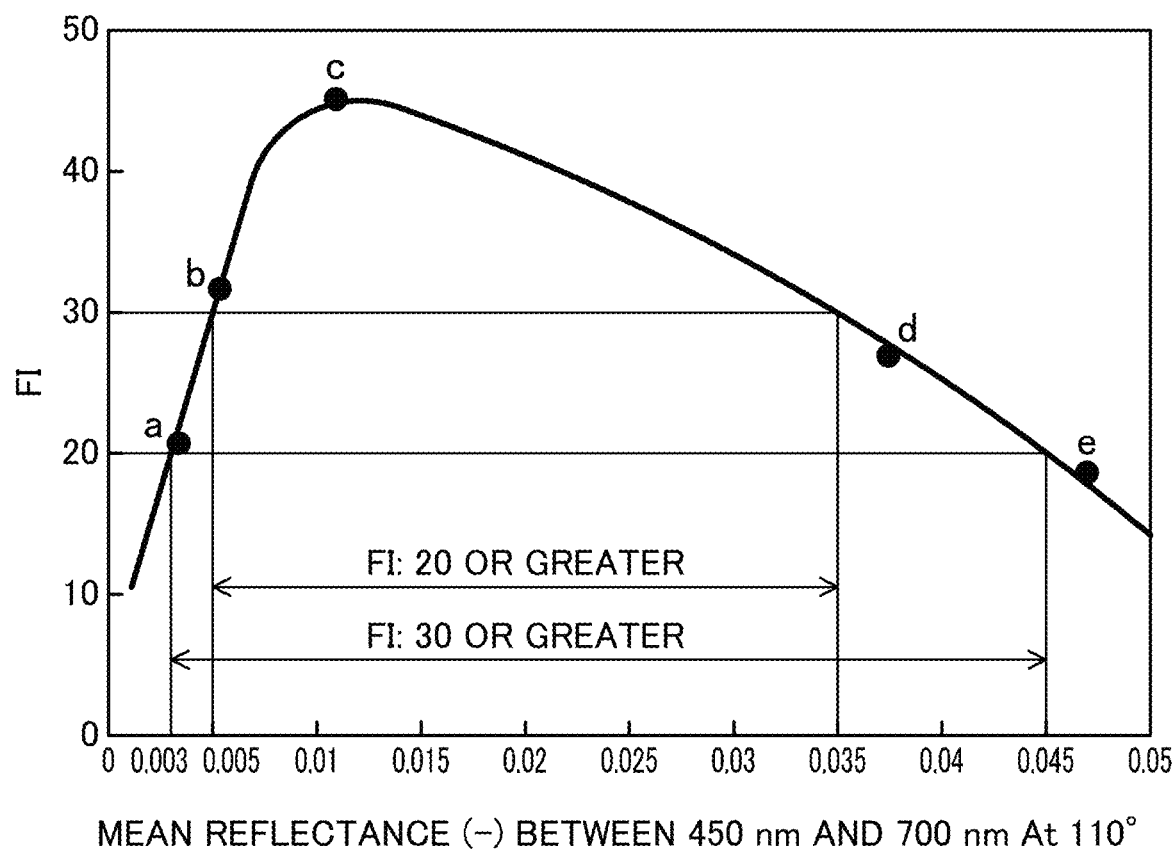
FIG. 8 is a graph showing a relationship between the mean reflectance at the light receiving angle of 110° and an FI value.

Measurement results are shown in FIG. 8. FIG. 8 shows that the FI value is greater than or equal to 20 if the mean reflectance at the light receiving angle of 110° is 0.003 or more and 0.045 or less, and that the FI value is greater than or equal to 30 if said mean reflectance is 0.005 or more and 0.035 or less.

<Transmission Properties of Colored Layer>

In the present embodiment, the inclination of a tangent to the spectrum of the spectral transmittance of the colored layer 15 at the wavelength of 620 nm with respect to light at the light incident angle of 45° and the light receiving angle of 25° is 0.012 nm$^{-1}$ or more and 0.03 nm$^{-1}$ or less, defined as an absolute value. The spectral transmittance of the colored layer 15 described herein can be obtained by dividing a spectral transmittance measured for the colored layer 15 stacked on the lustrous layer 14, by a spectral transmittance measured for the lustrous layer 14 from which the colored layer 15 is removed and therefore a surface of which is exposed.

FIGS. 9 and 10 show a spectrum of the spectral transmittances of the respective colored layers of the example and the comparative example. A three-dimensional gonio-spectrophotometric color measurement system GCMS-4 from Murakami Color Research Laboratory was used to measure the spectral reflectance. FIG. 9 shows the respective spectra of the spectral transmittances in the measurement wavelength range of between 420 nm and 740 nm. FIG. 10 is enlarged spectra of the spectral transmittances in the wavelength range of between 600 nm and 640 nm. The specifications of the multilayer coating films according to the example and the comparative example, the inclination of the tangent at the wavelength of 620 nm, and the chroma C* are shown in Table 1.

Figure 11:
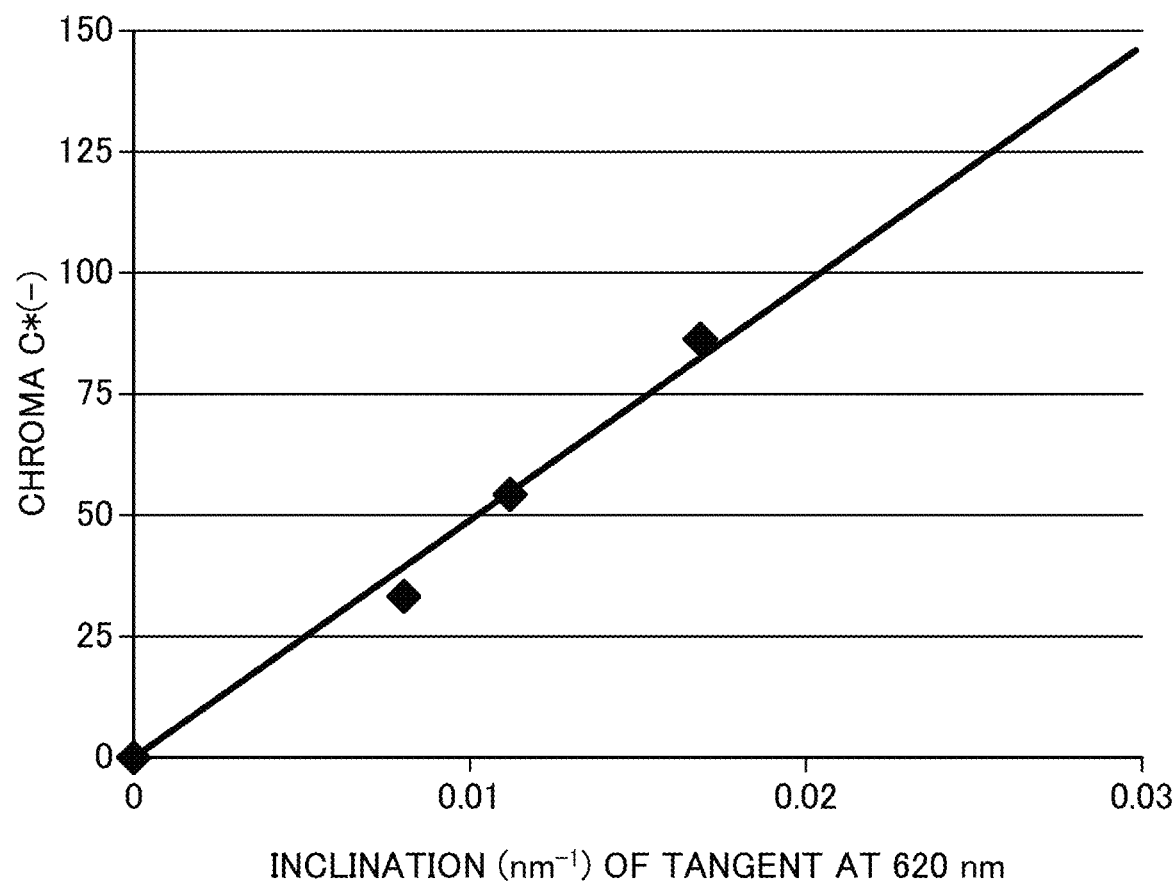
FIG. 11 is a graph showing a relationship between an inclination of a tangent to the spectrum at the wavelength of 620 nm and the chroma $C^*$.

According to the study of the present inventors, as shown in FIG. 11, the chroma C* is proportional to the inclination of the tangent to the spectrum at the wavelength of 620 nm; the chroma C* is almost 100 at the inclination of 0.02 nm$^{-1}$; and the chroma C* is approximately 150 (the upper limit) at the inclination of 0.03 nm$^{-1}$. The characteristics of the inclination of the tangent and the chroma C* shown in FIG. 11 were obtained in the following manner.

Figure 12:
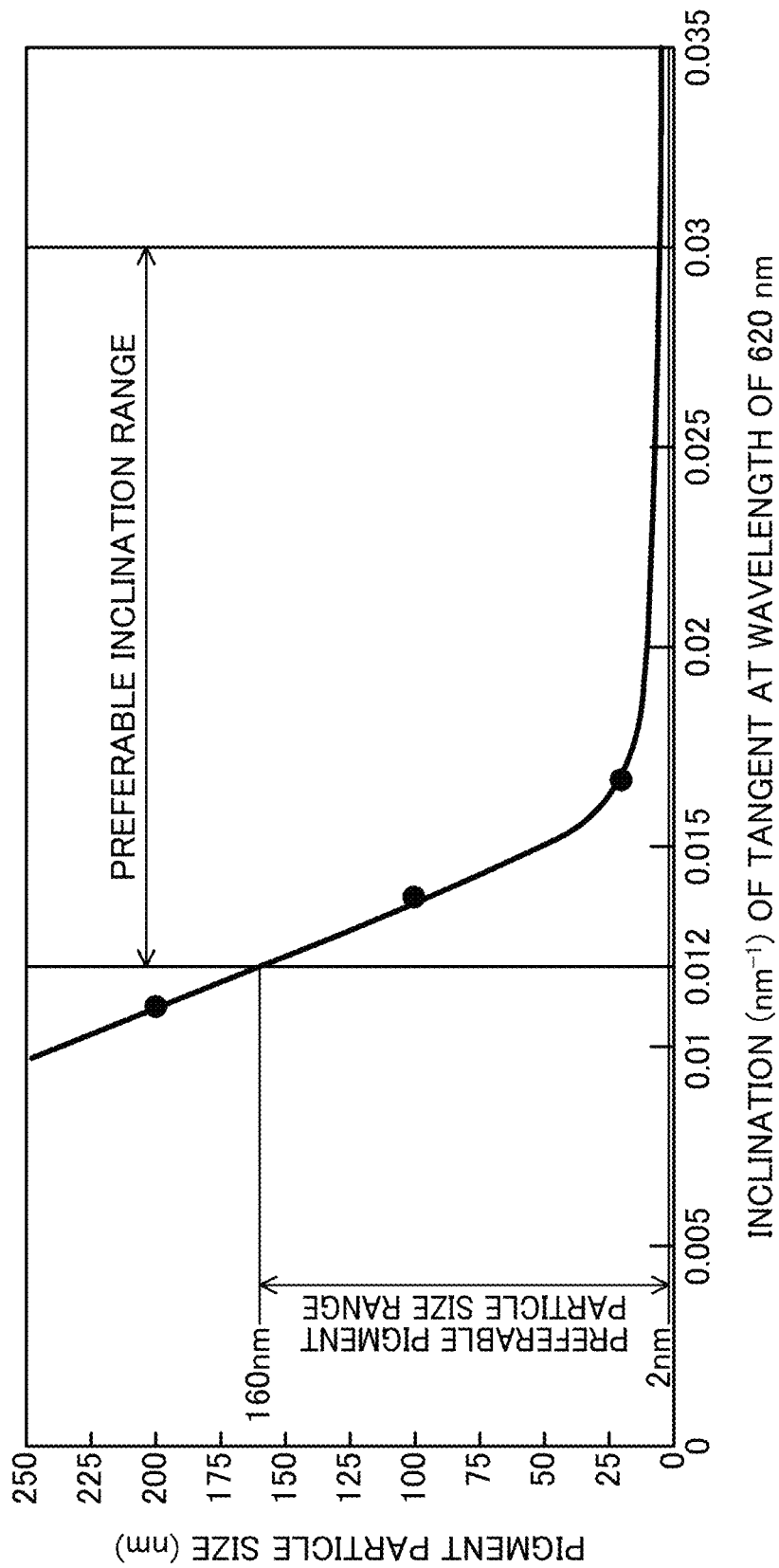
FIG. 12 is a graph showing a relationship between the inclination of a tangent to the spectrum at the wavelength of 620 nm and the particle size of the pigment in the colored layer.

A plurality of coated plates having the same configuration, except that the pigments of the colored layers had various different particle sizes, were prepared, and the spectra of the respective coated plates were measured. The inclination of the tangent at the wavelength of 620 nm was obtained as described above from the spectra measured, and X, Y, and Z values of the XYZ color system were calculated using a color-matching function. The XYZ was converted to L*a*b* and the chroma C* was calculated by the following equation: $C^* = \sqrt{((a^*)2 + (b^*)2)}$ The chroma C* is greater than or equal to 50 if the inclination of the tangent is greater than or equal to 0.012 nm$^{-1}$. Further, as shown in FIG. 12, the inclination of the tangent depends on the pigment particle size (mean particle size) of the colored layer. FIGS. 11 and 12 show that if the mean particle size of the pigment particles is 2 nm or more and 160 nm or less, the inclination of the tangent is 0.012 nm$^{-1}$ or more and 0.03 nm$^{-1}$ or less, and the development of a bright red color having high transparency with reduced turbidity can be achieved. That is, if the mean particle size of the pigment particles is 160 nm or less, geometrical-optical scattering or Mie scattering due to the pigment particles do not occur. If the mean particle size of the pigment particles is 2 nm or more, Rayleigh scattering can be avoided as well, which is advantageous in achieving development of a bright red color having transparency.

<Combination of Reflection Properties of Lustrous Layer and Transmission Properties of Colored Layer>

One of important characteristics of the present invention is that attempts were made to obtain a higher FI value of the multilayer coating film 12 through the combination of the reflection properties of the lustrous layer 14 and the transmission properties of the colored layer 15. Specifically, the transmission properties of the colored layer 15 vary according to the pigment concentration C of the colored layer 15. If the pigment concentration C is low, reflected light from the lustrous layer 14 (particularly the diffused light) is not much attenuated when passing through the color layer 15. The FI value is therefore not high. With an increase in the pigment concentration, more light is absorbed by the pigment particles when passing through the colored layer 15. Besides, an optical path length is increased because the light passes through the pigment particles. The shades therefore have lower lightness (The FI value increases). However, if the pigment concentration C is too high, more reflected light is blocked by the pigment particles, resulting in a smaller FI value.

Coated plates including the multilayer coating films of Samples 1 to 14 as shown in Table 3 (each with an electrodeposition coating film as a first coat) were prepared. With respect to each of these coated plates, the aluminum area percentage, Y(10°), Y(25°), the mean reflectance of the lustrous layer at the light receiving angle of 110°, the inclination of the tangent to the spectrum of the spectral transmittance at the wavelength of 620 nm, the FI value, and the brightness of the red color development were evaluated. The brightness of the color development was rated on four-point scale, namely "⊙", "○", "Δ" and "x." That is, "⊙" indicates the highest brightness, and the brightness stepwise decreases in the following order: "○", "Δ" and "x."

layer, based on the results shown in Table 3. In a case where Y(10°) of the lustrous layer 14 is set to be 50 or more and 950 or less, and the following equation holds: Y(25°)=k×Y(10°) (where k is 0.05 or more and 0.35 or less), the FI value can be 20 or more if the pigment concentration C of the colored layer 15 is 1% by mass or more and 17% by mass or less. In a case where Y(10°) is set to be 100 or more and 900 or less, and the following equation holds: Y(25°)=k×Y(10°) (where k is 0.05 or more and 0.35 or less), the FI value can be 30 or more if the pigment concentration C of the colored layer 15 is 3 or more and 12 or less.

<Designing Preferable Three Conditions (Y(10°), k, and Pigment Concentration C of Colored Layer)>

Figure 14:
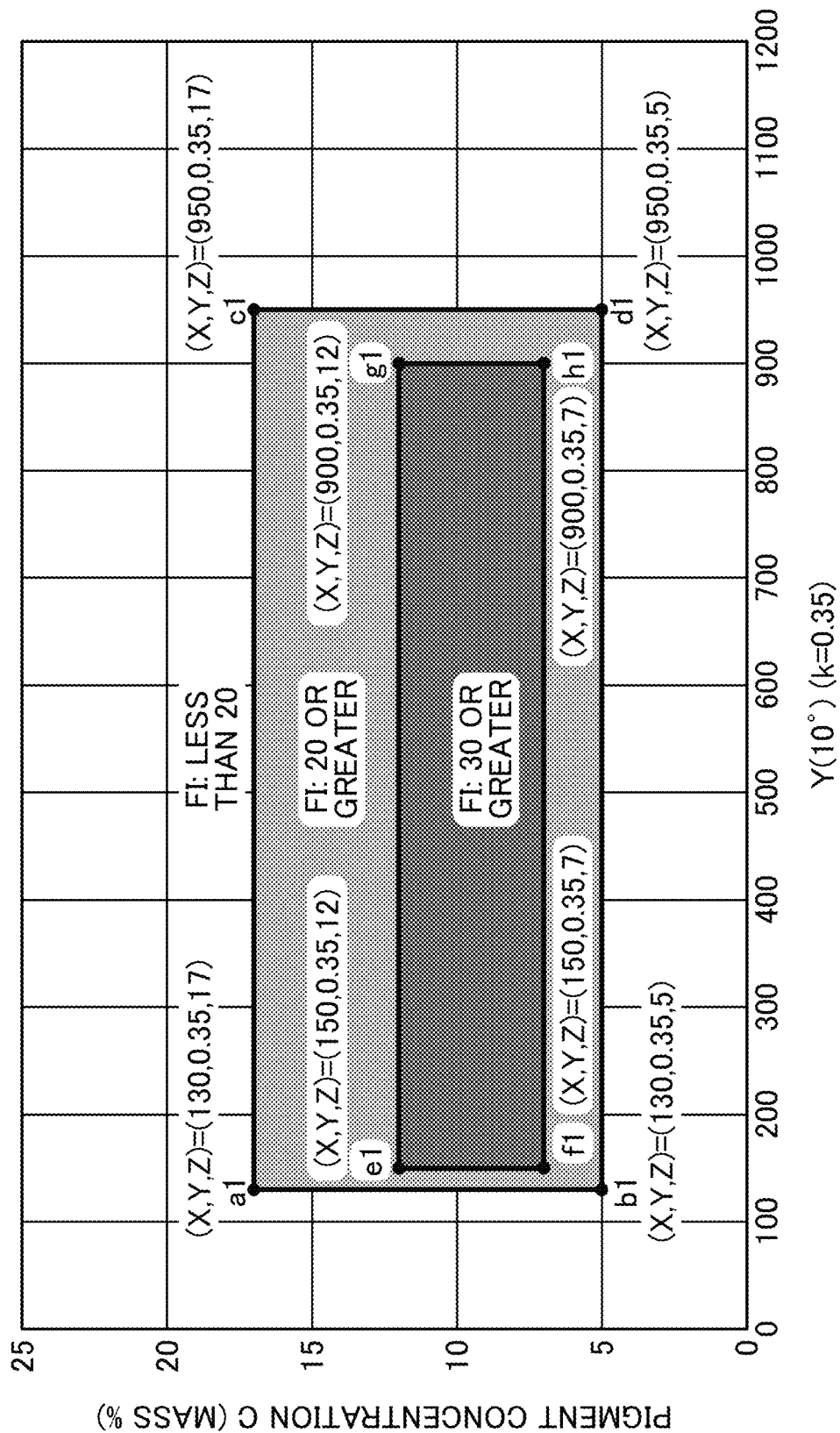
FIG. 14 is a graph showing preferable ranges of the pigment concentration C and Y(10°) when the coefficient k is equal to 0.35.

As illustrated in FIG. 14, an experiment on a test product shows that if k is 0.35, the FI value is 20 or more when Y(10°) satisfies 130≤Y(10°)≤950 and the pigment concentration C (defined by % by mass) satisfies 5≤C≤17. The FI value is 30 or more when Y(10°) and C satisfy 150≤Y(10°)≤900 and 7≤C≤12. In FIG. 14, the coordinates (X, Y, Z) given to the vertexes a1 to h1 of figures showing suitable

TABLE 3

| | | 1 | 2 | 3 | 4 | 5 | 6 | 7 |
|---|---|---|---|---|---|---|---|---|
| Lustrous Layer | Perylene Red (Mean Particle Size 200 nm) | 13.0 | 13.0 | 13.0 | 13.0 | 13.0 | 13.0 | 13.0 |
| | Aluminum Flake | 13.0 | 13.0 | 12.0 | 12.0 | 14.0 | 14.0 | 9.0 |
| | Chrome Oxide Flake | 0.5 | 0.5 | 1.0 | 1.0 | 0.0 | 0.0 | 2.5 |
| | Acrylic Resin | 44.6 | 44.6 | 44.9 | 44.9 | 44.3 | 44.3 | 45.8 |
| | Melamine Resin | 18.2 | 18.2 | 18.4 | 18.4 | 18.1 | 18.1 | 18.7 |
| | Additive | 10.7 | 10.7 | 10.7 | 10.7 | 10.6 | 10.6 | 10.9 |
| Colored Layer | Perylene Red (Mean Particle Size 30 nm) | 16.0 | 2.0 | 16.0 | 4.0 | 18.0 | 0.5 | 16.0 |
| | Acrylic Resin | 51.3 | 59.8 | 51.3 | 58.6 | 50.1 | 60.7 | 51.3 |
| | Melamine Resin | 27.4 | 32.0 | 27.4 | 31.3 | 26.8 | 32.5 | 27.4 |
| | Additive | 5.3 | 6.2 | 5.3 | 6.1 | 5.1 | 6.3 | 5.3 |
| Aluminum Area Percentage (%) | | 72 | 72 | 55 | 55 | 78 | 78 | 28 |
| $Y(10°)$ | | 80 | 80 | 130 | 130 | 40 | 40 | 920 |
| $Y(25°)$ | | 25 | 5 | 30 | 10 | 15 | 1.5 | 310 |
| Mean Reflectance at 110° Light Receiving Angle | | 0.039 | 0.035 | 0.02 | 0.015 | 0.050 | 0.047 | 0.005 |
| Tangent Inclination at 620 nm Wavelength | | 0.012 | 0.013 | 0.014 | 0.015 | 0.010 | 0.011 | 0.012 |
| FI Value | | 21 | 23 | 32 | 34 | 17 | 15 | 24 |
| Brightness of Red | | Δ | Δ | ○ | ○ | X | X | Δ |

| | | 8 | 9 | 10 | 11 | 12 | 13 | 14 |
|---|---|---|---|---|---|---|---|---|
| Lustrous Layer | Perylene Red (Mean Particle Size 200 nm) | 13.0 | 13.0 | 13.0 | 13.0 | 13.0 | 13.0 | 13.0 |
| | Aluminum Flake | 9.0 | 10.0 | 10.0 | 8.0 | 8.0 | 13.0 | 11.0 |
| | Chrome Oxide Flake | 2.5 | 2.0 | 2.0 | 3.0 | 3.0 | 1.5 | 2.0 |
| | Acrylic Resin | 45.8 | 45.5 | 45.5 | 46.1 | 46.1 | 44.0 | 44.9 |
| | Melamine Resin | 18.7 | 18.6 | 18.6 | 18.9 | 18.9 | 18.0 | 18.4 |
| | Additive | 11.0 | 10.9 | 10.9 | 11.0 | 11.0 | 10.5 | 10.7 |
| Colored Layer | Perylene Red (Mean Particle Size 30 nm) | 2.0 | 16.0 | 4.0 | 18.0 | 0.5 | 6.0 | 6.0 |
| | Acrylic Resin | 59.8 | 51.3 | 58.6 | 50.1 | 60.7 | 57.4 | 57.4 |
| | Melamine Resin | 32.0 | 27.4 | 31.3 | 26.8 | 32.5 | 30.7 | 30.7 |
| | Additive | 6.2 | 5.3 | 6.1 | 5.1 | 6.3 | 5.9 | 5.9 |
| Aluminum Area Percentage (%) | | 28 | 25 | 25 | 20 | 20 | 45 | 30 |
| $Y(10°)$ | | 920 | 870 | 870 | 960 | 960 | 180 | 800 |
| $Y(25°)$ | | 60 | 200 | 70 | 350 | 40 | 25 | 80 |
| Mean Reflectance at 110° Light Receiving Angle | | 0.008 | 0.007 | 0.004 | 0.002 | 0.001 | 0.010 | 0.005 |
| Tangent Inclination at 620 nm Wavelength | | 0.014 | 0.015 | 0.017 | 0.010 | 0.012 | 0.018 | 0.020 |
| FI Value | | 25 | 33 | 35 | 19 | 17 | 45 | 52 |
| Brightness of Red | | Δ | ○ | ○ | X | X | ⊙ | ⊙ |

(Amount of mixture for each layer is expressed by mass %.)

Figure 13:
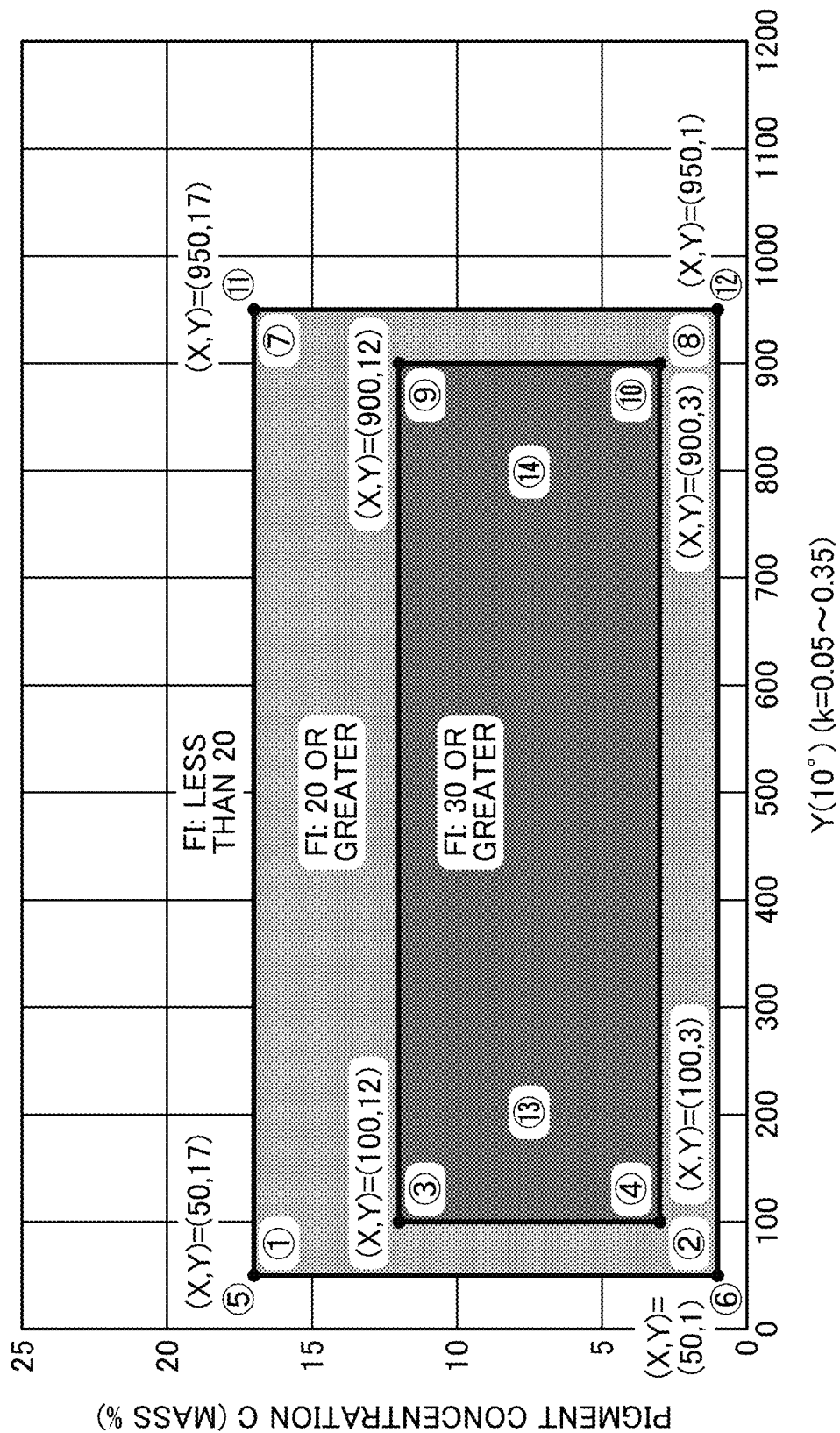
FIG. 13 is a graph showing preferable ranges of the pigment concentration C and Y(10°) when Y(25°) is equal to k×Y(10°) (the coefficient k is equal to 0.05 to 0.35).

FIG. 13 is a graph showing the dependence of the FI value on Y(10°) and on the pigment concentration C of the colored ranges indicate the coordinates of a three-dimensional orthogonal coordinate space whose X-, Y- and Z-coordinate axes represent three variables Y(10°), k and C, respectively. The same explanation regarding the coordinates (X, Y, Z) applies to FIGS. 15 and 16.

Figure 15:
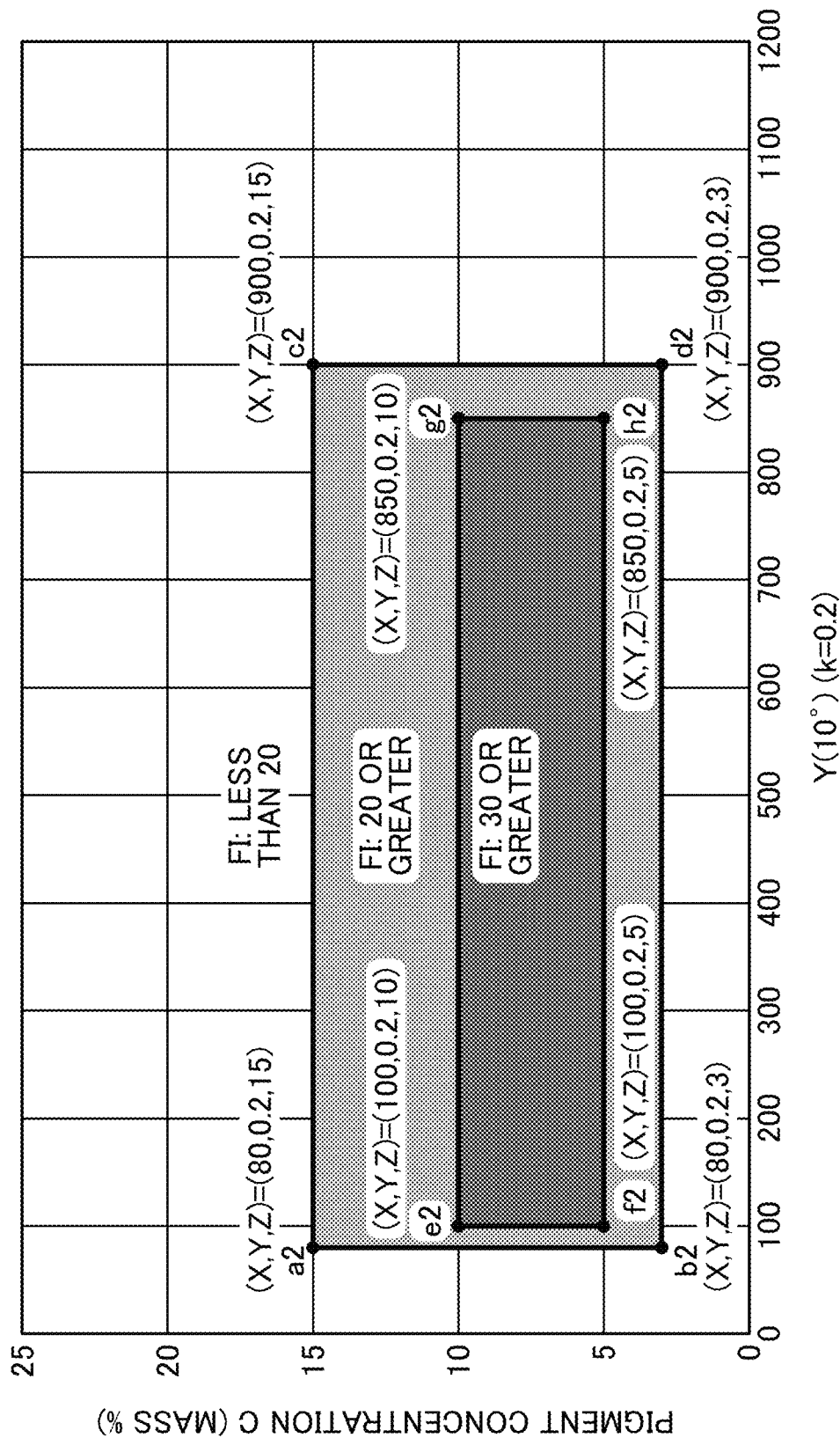
FIG. 15 is a graph showing preferable ranges of the pigment concentration C and Y(10°) when the coefficient k is equal to 0.2.

Similarly, as illustrated in FIG. 15, if k is 0.2, the FI value is 20 or more when Y(10°) and C satisfy 80≤Y(10°)≤900 and 3≤C≤15. The FI value is 30 or more when Y(10°) and C satisfy 100≤Y(10°)≤850 and 5≤C≤10.

Figure 16:
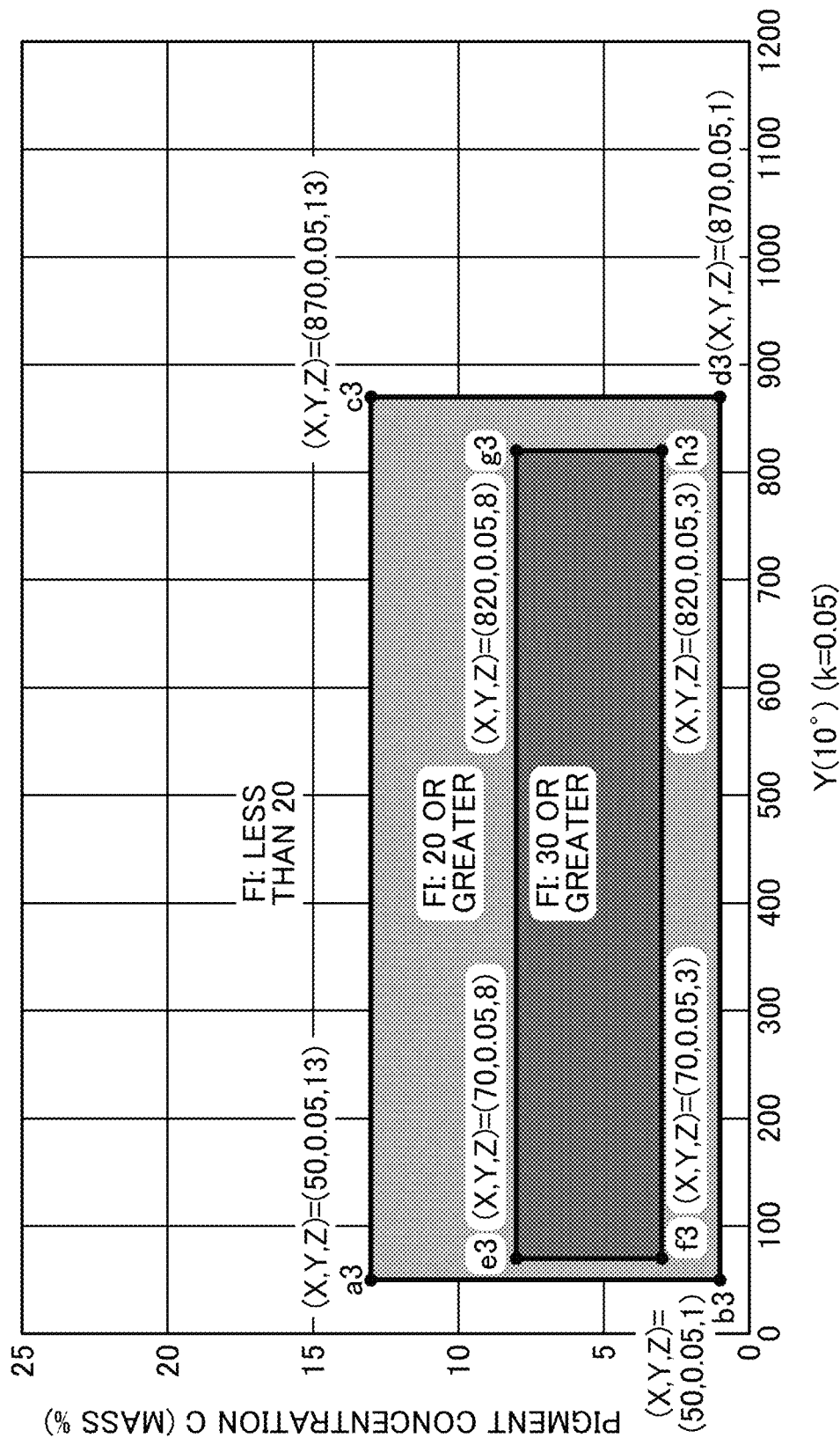
FIG. 16 is a graph showing preferable ranges of the pigment concentration C and Y(10°) when the coefficient k is equal to 0.05.

Similarly, as illustrated in FIG. 16, if k is 0.05, the FI value is 20 or more when Y(10°) and C satisfy 50≤Y(10°) ≤870 and 1≤C≤13. The FI value is 30 or more when Y(10°) and C satisfy 70≤Y(10°)≤800 and 3≤C≤8.

Figure 17:
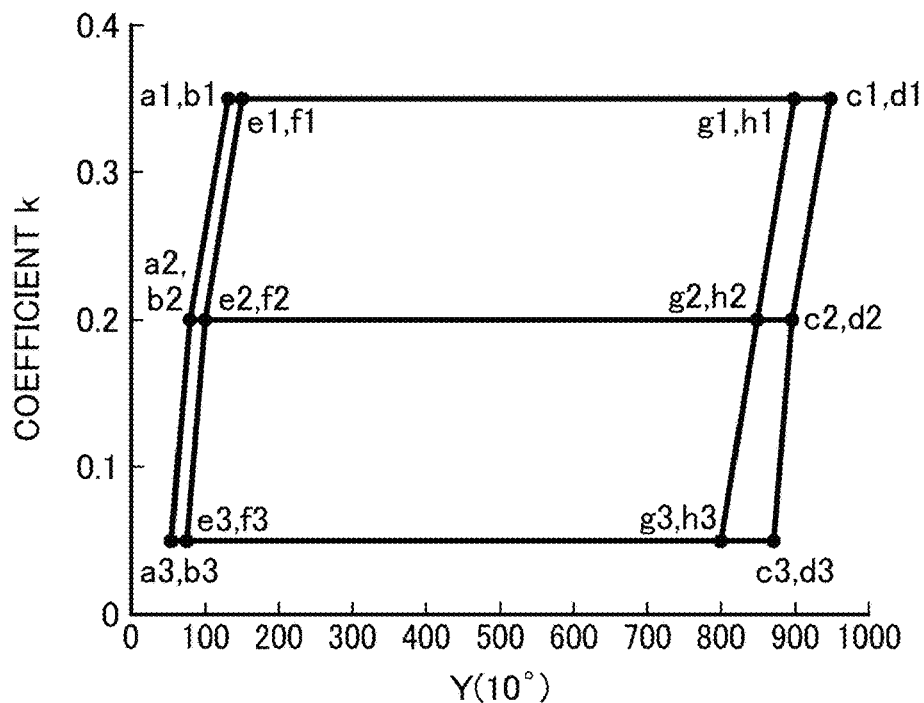
FIG. 17 is a graph showing a relationship between Y(10°) and the coefficient k.

FIG. 17 illustrates a two-dimensional orthogonal coordinate system whose coordinate axes represent two variables, i.e., Y(10°) and the coefficient k. The vertexes a1 to h1, a2 to h2, and a3 to h3 shown in FIGS. 14 to 16 are plotted in FIG. 17 to see the relationship between Y(10°) and the coefficient k. A suitable range of the coefficient k differs depending on Y(10°) as shown in the figure.

Figure 18:
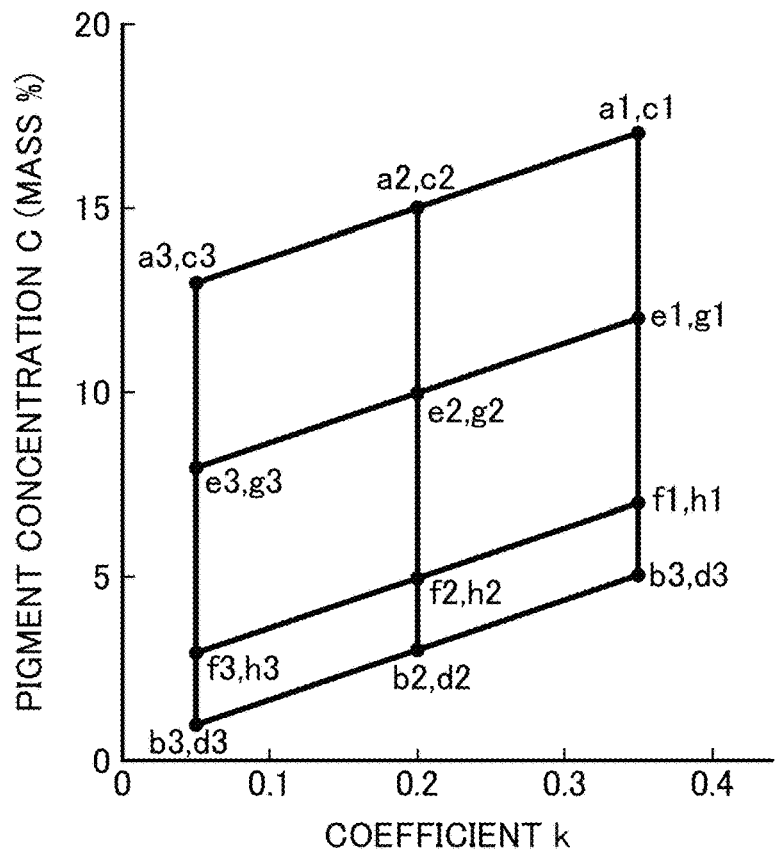
FIG. 18 is a graph showing a relationship between the coefficient k and the pigment concentration C.

FIG. 18 illustrates a two-dimensional orthogonal coordinate system whose coordinate axes represent two variables, i.e., the coefficient k and the pigment concentration C. The vertexes a1 to h1, a2 to h2, and a3 to h3 are plotted in FIG. 18 to see the relationship between the coefficient k and the pigment concentration C. A suitable range of the pigment concentration C differs depending on the coefficient k as shown in the figure.

Figure 19:
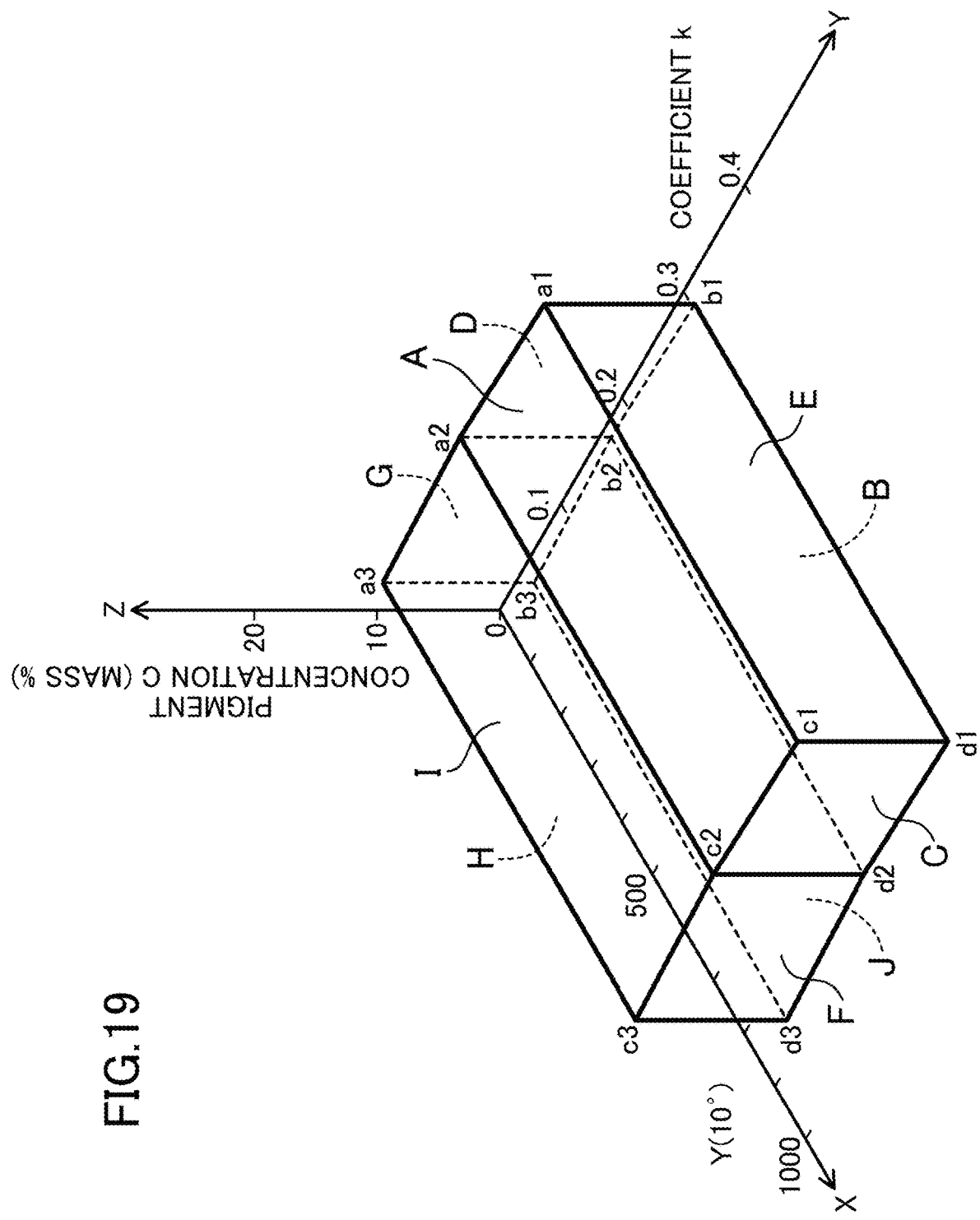
FIG. 19 is a graph showing ranges of Y(10°), the coefficient k, and the pigment concentration C when the FI value is 20 or more.

Thus, as illustrated in FIG. 19, ranges of Y(10°), the coefficient k, and the pigment concentration C at which the FI value is 20 or more can be expressed by the three-dimensional orthogonal coordinate space whose X-, Y-, and Z-coordinate axes represent the three variables Y(10°), k and C.

Specifically, the polyhedron shown in FIG. 19 is formed by the vertexes a1 to d1, a2 to d2, and a3 to d3 plotted in the three-dimensional orthogonal coordinate space. The polyhedron consists of ten planes A to J in total, each including four vertexes shown in Table 4.

A plane defined by the coordinates (X, Y, Z) of the three-dimensional orthogonal coordinate space can be expressed by the equation "$\alpha X + \beta Y + \gamma Z + \delta = 0$." The ten planes are expressed by the equations shown in Table 4.

TABLE 4

| Plane | Vertexes | Equation for Plane |
| --- | --- | --- |
| A | (a1, c1, a2, c2) | A: $1640y - 123z + 1517 = 0$ |
| B | (b1, d1, b2, d2) | B: $1640y - 123z + 41 = 0$ |
| C | (c1, d1, c2, d2) | C: $-1.8x + 600y + 1500 = 0$ |
| D | (a1, b1, a2, b2) | D: $-1.8x + 600y + 24 = 0$ |
| E | (a1, b1, c1, d1) | E: $-9840y + 3444 = 0$ |
| F | (c2, d2, c3, d3) | F: $-1.8x + 360y + 1548 = 0$ |
| G | (a2, b2, a3, b3) | G: $-1.8x + 360y + 72 = 0$ |
| H | (a3, b3, c3, d3) | H: $-9840y + 492 = 0$ |
| I | (a2, c2, a3, c3) | A: $1640y - 123z + 1517 = 0$ |
| J | (b2, d2, b3, d3) | B: $1640y - 123z + 41 = 0$ |

The planes A and I are expressed by the same equation, which means that these planes are the same plane. The planes B and J are expressed by the same equation, which means that these planes are the same plane. Thus, the polyhedron shown in FIG. 19 can be said to be an octahedron consisting of the eight planes A to H. The C and F planes of this octahedron form an inwardly protruding ridge, and the D and G planes form an outwardly protruding ridge.

Specifically, the polyhedron shown in FIG. 19 is an octahedron which consists of the eight planes expressed by the equations A to H listed in Table 3, wherein the planes expressed by the equations C and F form an inwardly protruding ridge, and the planes expressed by the equations D and G form an outwardly protruding ridge. The FI value is 20 or more if Y(10°), the coefficient k, and the pigment concentration C satisfy that the coordinates (Y(10°), k, C) are in the range defined by the octahedron.

Figure 20:
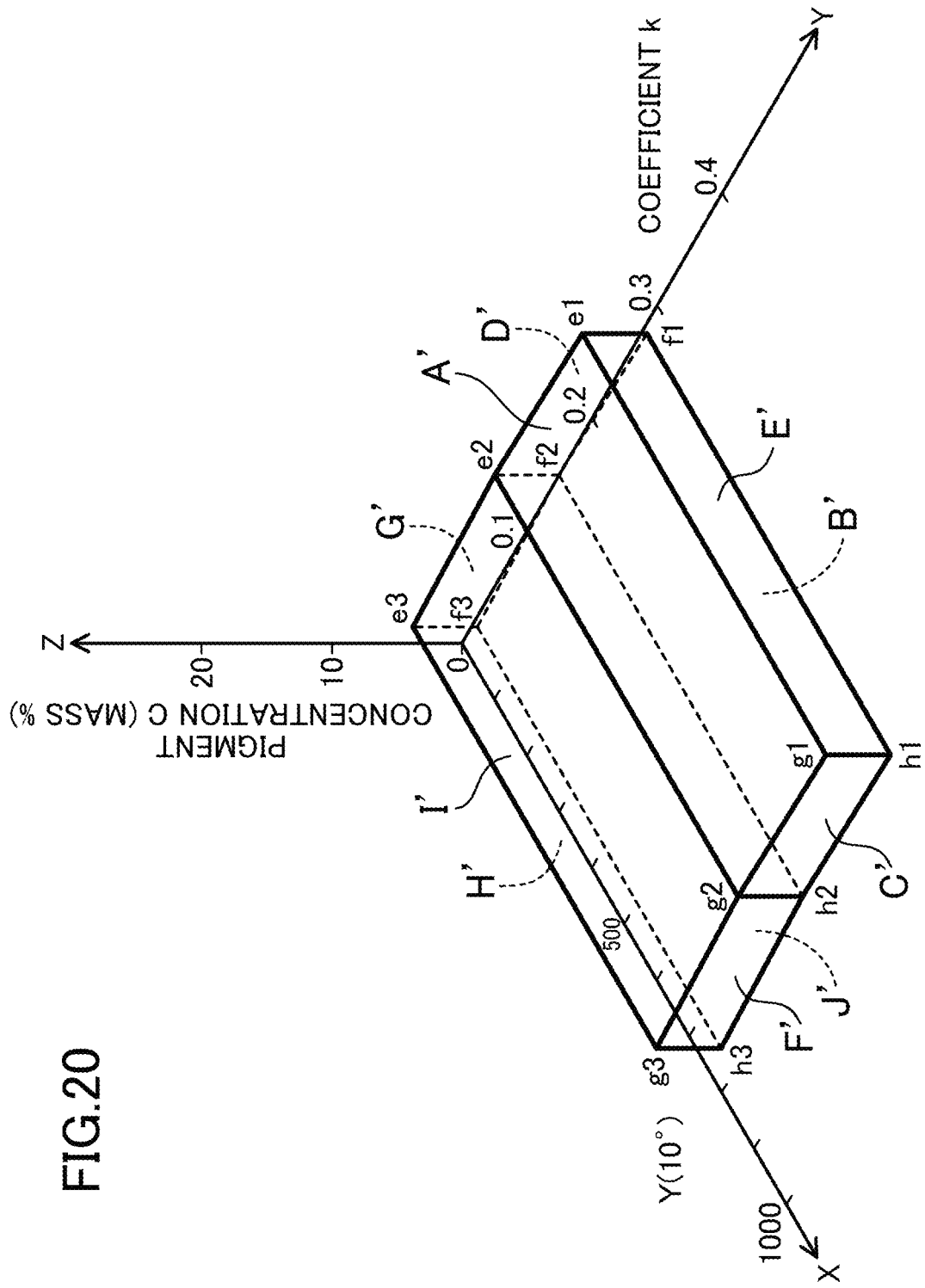
FIG. 20 is a graph showing ranges of Y(10°), the coefficient k, and the pigment concentration C when the FI value is 30 or more.

Further, as illustrated in FIG. 20, ranges of Y(10°), the coefficient k, and the pigment concentration C at which the FI value is 30 or more can be expressed by the three-dimensional orthogonal coordinate space whose X-, Y-, and Z-coordinate axes represent the three variables Y(10°), k and C. Specifically, this polyhedron is formed by the vertexes e1 to h1, e2 to h2, and e3 to h3 plotted in the three-dimensional orthogonal coordinate space, and consists of ten planes A' to J' in total, each including four vertexes shown in Table 5. The ten planes are expressed by the equations shown in Table 5.

TABLE 5

| Plane | Vertexes | Equation for Plane |
| --- | --- | --- |
| A' | (e1, g1, e2, g2) | A': $1500y - 112.5z + 825 = 0$ |
| B' | (f1, h1, f2, h2) | B': $1500y - 112.5z + 262.5 = 0$ |
| C' | (g1, h1, g2, h2) | C': $-0.75x + 250y + 587.5 = 0$ |
| D' | (e1, f1, e2, f2) | D': $-0.75x + 250y + 25 = 0$ |
| E' | (e1, f1, g1, h1) | E': $-3250y + 1137.5 = 0$ |
| F' | (g2, h2, g3, h3) | F': $-0.75x + 150y + 607.5 = 0$ |
| G' | (e2, f2, e3, f3) | G': $-0.75x + 150y + 45 = 0$ |
| H' | (e3, f3, g3, h3) | H': $-3750y + 187.5 = 0$ |
| I' | (e2, g2, e3, g3) | A': $1500y - 112.5z + 825 = 0$ |
| J' | (f2, h2, f3, h3) | B': $1500y - 112.5z + 262.5 = 0$ |

The planes A' and I' are expressed by the same equation, which means that these planes are the same plane. The planes B' and J' are expressed by the same equation, which means that these planes are the same plane. Thus, the polyhedron shown in FIG. 20 can be said to be an octahedron consisting of the eight planes A' to H'. The C' and F' planes of this octahedron form an inwardly protruding ridge, and the D' and G' planes form an outwardly protruding ridge.

Specifically, the polyhedron shown in FIG. 20 is an octahedron which consists of the eight planes expressed by the equations A' to H' listed in Table 2, wherein the planes expressed by the equations C' and F' form an inwardly protruding ridge, and the planes expressed by the equations D' and G' form an outwardly protruding ridge. The FI value is 30 or more if Y(10°), the coefficient k, and the pigment concentration C satisfy that the coordinates (Y(10°), k, C) are in the range defined by the octahedron.

DESCRIPTION OF REFERENCE CHARACTERS

11 Automobile Body (Steel Plate)
12 Multilayer Coating Film
13 Electrodeposition Coating Film
14 Lustrous Layer
15 Colored Layer
16 Transparent Clear Layer
21 High-Reflection Flake (Luster Material)
22 Low-Reflection Flake (Luster Material)
23 Pigment
25 Pigment

The invention claimed is:
1. A multilayer coating film, comprising:
a lustrous layer containing a luster material and formed directly or indirectly on a surface of a coating target; and a colored layer which is translucent, containing a warm color pigment, and layered on the lustrous layer, wherein the lustrous layer contains, in a mixed state, a high-reflection flake having a visible light reflectance of 90% or more and a low-reflection flake having a visible light reflectance that is one fourth (¼) or smaller than the visible light reflectance of the high-reflection flake as the luster material, when both of the high-reflection flake and the low-reflection flake are projected on a bottom of the lustrous layer, a ratio of a projected area of the flakes on the bottom of the lustrous layer is 100%, a ratio of a total area of the high-reflection flake with respect to a total area of both of the high-reflection flake and the low-reflection flake is 25% or more and 75% or less, and a concentration of the warm color pigment in the colored layer is 2% by mass or more and 16% by mass or less.

2. The multilayer coating film of claim 1, wherein the low-reflection flake is smaller in thickness than the high-reflection flake.

3. The multilayer coating film of claim 1, wherein the high-reflection flake is an aluminum flake, and the low-reflection flake is a chrome oxide flake.

4. The multilayer coating film of claim 1, wherein a mean value of reflectances of the lustrous layer which are measured at a light receiving angle of 110° in the case of a light incident angle of 45° within a wavelength range of between 450 nm and 700 nm is set to be 0.003 or more and 0.045 or less, defined as an absolute value, with respect to a reflectance of a standard white plate.

5. The multilayer coating film of claim 1, wherein the pigment of the colored layer is a reddish pigment.

6. A coated object having the multilayer coating film of claim 1.

* * * * *